(12) United States Patent
Potnis et al.

(10) Patent No.: US 7,943,266 B2
(45) Date of Patent: May 17, 2011

(54) SOFC SEAL AND CELL THERMAL MANAGEMENT

(75) Inventors: Shailesh Vijay Potnis, Neenah, WI (US); Timothy Joseph Rehg, Huntington Beach, CA (US)

(73) Assignee: General Electric Company, Schenectady, NY (US)

( * ) Notice: Subject to any disclaimer, the term of this patent is extended or adjusted under 35 U.S.C. 154(b) by 1076 days.

(21) Appl. No.: 11/257,156

(22) Filed: Oct. 25, 2005

(65) Prior Publication Data

US 2007/0092781 A1    Apr. 26, 2007

(51) Int. Cl.
*H01M 8/02* (2006.01)
*H01M 8/12* (2006.01)

(52) U.S. Cl. .................................. 429/460; 429/479

(58) Field of Classification Search .......... 429/12–46, 429/460
See application file for complete search history.

(56) References Cited

U.S. PATENT DOCUMENTS

| | | | |
|---|---|---|---|
| 5,453,331 A | 9/1995 | Bloom et al. | |
| 6,271,158 B1 | 8/2001 | Xue et al. | |
| 6,432,567 B1 * | 8/2002 | Doggwiler et al. | 429/19 |
| 6,541,146 B1 | 4/2003 | Xue et al. | |
| 6,656,525 B2 | 12/2003 | Rae | |
| 2005/0118482 A1* | 6/2005 | Sriramulu et al. | 429/34 |

FOREIGN PATENT DOCUMENTS

| | | |
|---|---|---|
| EP | 0355420 | 2/1990 |
| EP | 0749171 | 4/1999 |
| EP | 1701402 | 9/2006 |
| WO | WO 2004/020559 | 3/2004 |
| WO | WO 2004020559 A2 * | 3/2004 |

OTHER PUBLICATIONS

European Search Report for Application No. EP 06 25 4383 on Mar. 7, 2007, at The Hague.

* cited by examiner

*Primary Examiner* — Patrick Ryan
*Assistant Examiner* — Brent Thomas
(74) *Attorney, Agent, or Firm* — Nixon & Vanderhye, P.C.

(57) ABSTRACT

The solid oxide fuel cell module includes a manifold, a plate, a cathode electrode, a fuel cell and an anode electrode. The manifold includes an air or oxygen inlet in communication with divergent passages above the periphery of the cell which combine to flow the air or oxygen radially or inwardly for reception in the center of the cathode flow field. The latter has interconnects providing circuitous cooling passages in a generally radial outward direction cooling the fuel cell and which interconnects are formed of different thermal conductivity materials for a preferential cooling.

22 Claims, 4 Drawing Sheets

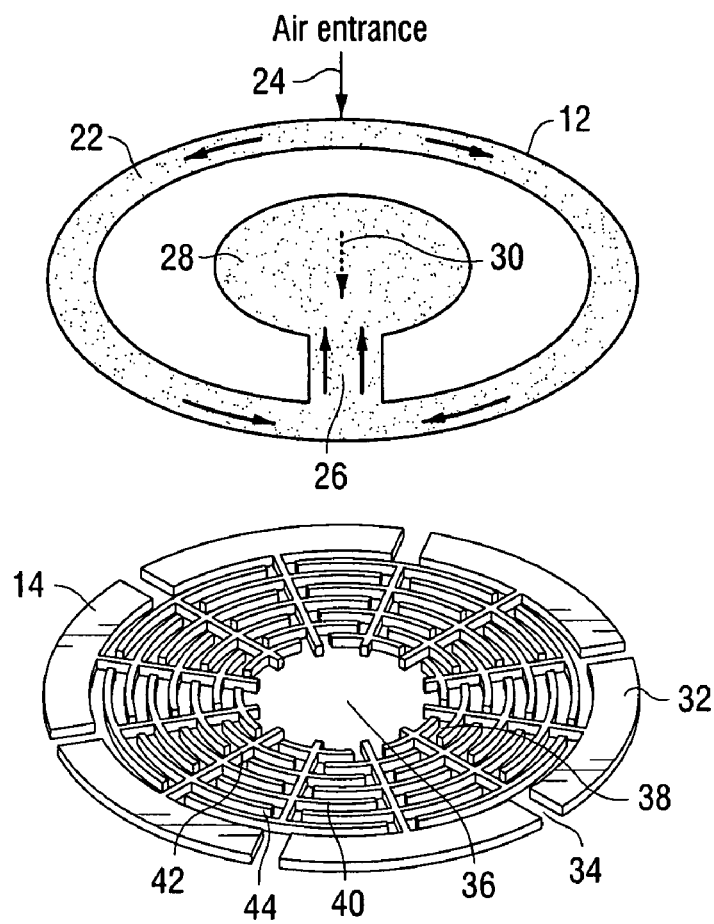
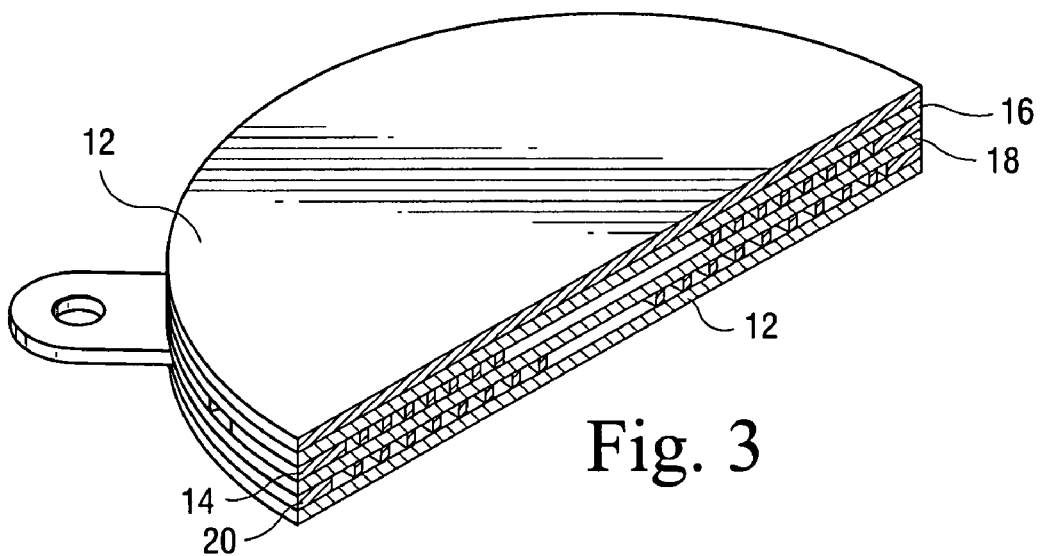

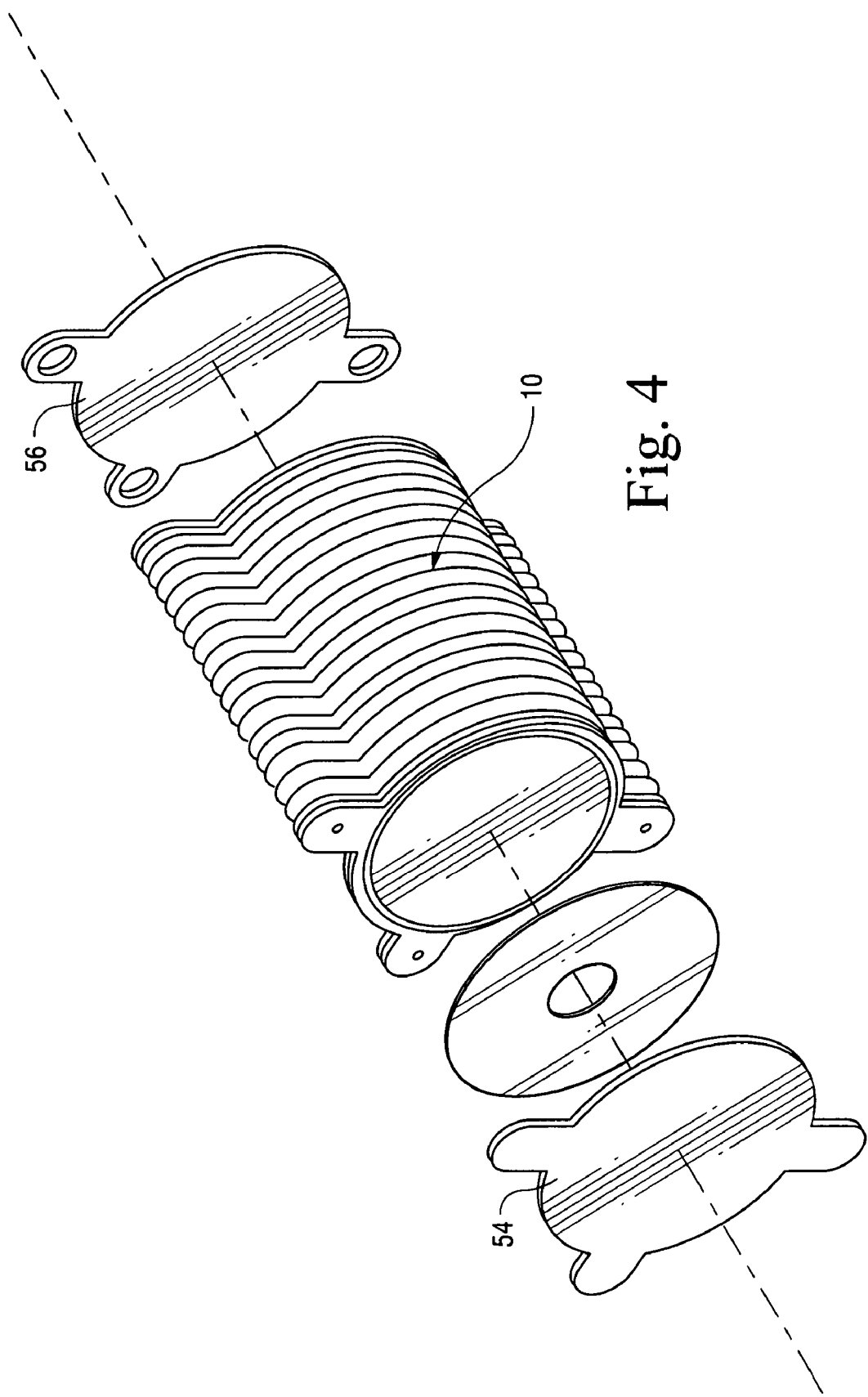

SOFC SEAL AND CELL THERMAL MANAGEMENT

The U.S. government may have certain rights in this invention pursuant to Contract No. DE-FC26-01NT41245 awarded by the U.S. Department of Energy.

BACKGROUND OF THE INVENTION

The present invention relates to a solid oxide fuel cell and particularly to a fuel cell having preferential cooling of the seals to maintain low cell temperature difference across the seal and cell and interconnects formed of different materials in the cathode flow field to control heat transfer and to yield uniform cell temperature.

A fuel cell is an electrochemical device in which a hydrogen or a hydrocarbon fuel is electrochemically reacted with air or oxygen to produce electricity, heat and water. A fuel cell typically includes a cathode flow field for flowing oxidant, an anode flow field for flowing hydrogen or a hydrocarbon fuel and a cell between the cathode and anode flow fields typically formed of a hard ceramic electrolyte. Oxygen ions are formed at the oxidant electrode i.e., the cathode, and when the hydrogen or other hydrocarbon fuel is passed over the fuel electrode, i.e., the anode, the oxygen ions migrate through the hard ceramic electrolyte to oxidize the fuel, transforming the hydrogen to water and carbon monoxide to carbon dioxide while releasing electrons. The electrons move out through an external circuit to create electricity. High seal temperature and high temperature gradients across the seal however can lead to fuel leakage, anode oxidation and performance degradation. Cooling the seals to maintain lower uniform temperature can eliminate those issues. Further, high temperature gradients across the cell can lead to high thermal stress which, in turn, can result in cell cracking and reduced stack life. Improved heat transfer communication between the cell and the interconnects i.e. the ribs of the cathode flow field defining the oxidant flow passage, can reduce the thermal gradient and prevent cell cracking. Accordingly, there is a need for improving the seal and managing the thermal gradients across the cell.

BRIEF DESCRIPTION OF THE INVENTION

In a preferred embodiment of the present invention there is provided a solid oxide fuel cell comprising: a layered array of a manifold, a cathode flow field, an electrolytic layer forming a cell including an anode electrode and a cathode electrode on opposite sides of the electrolytic layer, an anode flow field and an anode flow field closure member; the cathode flow field including a central oxidant flow inlet and a plurality of oxidant flow passages in communication with the cathode flow field inlet; the manifold including an oxidant inlet and an oxidant outlet in communication with the oxidant flow inlet of the cathode flow field; and the manifold, the cathode flow field and cell having a seal about a periphery of the solid oxide fuel cell, the manifold having passageways extending from the manifold oxidant inlet about the cell periphery and in communication with the manifold outlet to preferentially direct cathode oxidant flow about the seal to cool the seal.

In a further preferred aspect of the present invention, there is provided a solid oxide fuel cell comprising: a layered array of a manifold, a cathode flow field, an electrolytic layer forming a cell, including a cathode and an anode, an anode flow field and an anode flow field closure member; the cathode flow field including an oxidant flow inlet and a plurality of oxidant flow passages in communication with the cathode flow field inlet and terminating in respective outlets adjacent a periphery of the cathode flow field; the manifold including an oxidant inlet and an oxidant outlet in communication with the oxidant flow inlet of the cathode flow field; the manifold, the cathode flow field and the cell having a seal about a periphery of the solid oxide fuel cell, the manifold oxidant inlet being disposed adjacent a predetermined peripheral location and passageways extending from the manifold oxidant inlet in opposite directions about the manifold periphery terminating at a location generally opposite the manifold oxidant inlet in communication with the manifold outlet, the passageways lying adjacent the seal to cool the seal.

In a further preferred embodiment hereof, there is provided an array of solid oxide fuel cell modules comprising: a plurality of fuel cell modules arrayed against one another; each of the modules including a layered array of a manifold, a cathode flow field, an electrolytic layer forming a fuel cell including an anode electrode and a cathode electrode on opposite sides of the electrolytic layer, and an anode flow field; the cathode flow field of each module including a central oxidant flow inlet and a plurality of oxidant flow passages in communication with the cathode flow field inlet of the cell; the manifold of each module including an oxidant inlet port and an oxidant outlet in communication with the oxidant flow inlet of the cathode flow field; and each of the manifolds between the cathode flow field of one manifold and an anode flow field of an adjacent module having a fuel inlet and a fuel outlet for flowing fuel to the anode flow field of the adjacent module.

BRIEF DESCRIPTION OF THE DRAWINGS

FIG. 2 is a schematic perspective view of the manifold illustrating the flow of oxidant into the cathode flow field;

FIG. 3 is a perspective with parts in cross section illustrating a single cell of stacked solid oxide fuel cells illustrated in FIG. 4;

FIG. 4 is an exploded perspective view of a series of the stacked fuel cells.

Referring now to FIGS. 1 and 3, there is illustrated a solid oxide fuel cell module generally designated 10 comprising a manifold 12, a cathode flow field 14, a plate 16 interposed between the manifold 12 and cathode flow field 14, a fuel cell 18 and an anode flow field 20. An arrangement of stacked solid oxide fuel cells is illustrated in FIG. 4 wherein the fuel cell modules 10 are stacked one against the other with the manifold of one forming a closure member for the anode flow field of the adjacent fuel cell. It will be appreciated that each fuel cell including manifold 12, plate 16, cathode flow field 14, cell 18 and anode flow field 20 are peripherally sealed one to the other except at various inlets and outlets as conventional or to be described.

Referring to FIG. 2, the manifold 12 is schematically illustrated to demonstrate the direction and locations of the air or oxygen flow. Manifold 12 includes a peripheral air or oxygen passageway 22 about the margin of the manifold 12. Particularly, manifold 12 includes an air or oxygen inlet 24 for supplying air to passageways 22 which diverge one from the other and from inlet 24 to extend in opposite directions about the periphery of the fuel cell. In the illustrated example, the SOFC is circular and hence the air or oxygen from inlet 24 diverges in opposite directions passing about the periphery for about 180° to a location opposite the air or oxygen inlet 24.

Figure 1:
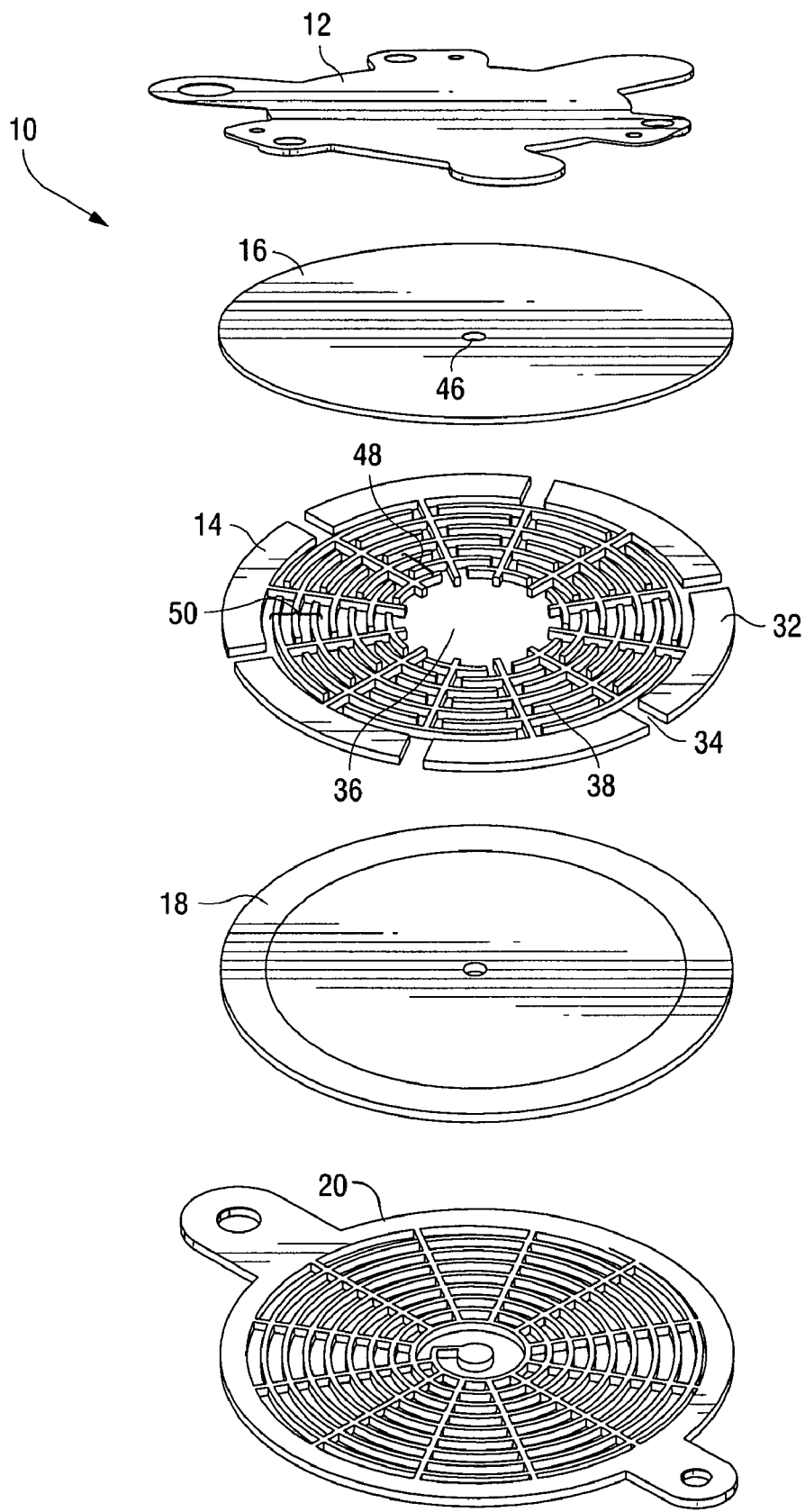
FIG. 1 is an exploded perspective view of a solid oxide fuel cell illustrating various aspects of the present invention.

The passageways 22 preferably intersect and communicate with a radial passage 26 extending into a sub-manifold 28 in the center of the manifold 12. The sub-manifold 28 includes a central opening which, as indicated by the arrow 30, directs the air or oxygen towards the center of the cathode flow field 14.

Referring again to FIGS. 1 and 2, the cathode flow field 14 includes a periphery 32 having a plurality of outlets 34 at spaced circumferential positions thereabout. The outlets 34 while in communication with the central portion 36 of the cathode flow field 14 by way of a plurality of passages 38. In the illustrated example, the passages 38 form a generally zig zag pattern for flowing the air or oxygen in opposite circumferential directions as the air or oxygen flow is directed radially outwardly toward outlets 34. The passages 38 are therefore circuitous and are defined by interconnects 40. Interconnects 40 include in this example generally radially extending interconnects 42 and circumferentially extending interconnects 44 which essentially form a plurality of circumferentially spaced inverted Christmas tree arrangements from the center 36 to the outlets 34. It will be appreciated that other configurations of circuitous passages for flowing the air or oxygen may be provided. Referring back to FIG. 1, plate 16 is interposed between the manifold 12 and cathode flow field 14. Plate 16 includes a central opening 46 enabling flow of the air or oxygen from the sub-manifold 28 through opening 46 into the central portion 36 of the cathode flow field 14 and circuitously in circumferential and radial directions to outlets 34. One side of the fuel cell 18 confines the air or oxygen within the passages 34 while the plate 16 confines the air or oxygen along the opposite side of passages 34. To complete the cell, the anode flow field 20 is sealed about the periphery to the fuel cell 18. As illustrated in FIG. 1, the anode flow field includes various passages for flowing hydrogen or a hydrocarbon fuel.

From the foregoing it will be appreciated that the air or oxygen flow entering the manifold 12 is directed about the peripheral seal and about the periphery of the fuel cell to provide cooling. The air or oxygen is then directed to the cathode flow field through a hole in the center of manifold 12 and the hole 46 through plate 16. With the illustrated arrangement of a single inlet with air or oxygen diverging about the seal periphery and then flowing radially inwardly for flow into the central portion i.e. the sub-manifold 28 of the cathode flow field, a minimal pressure drop occurs which reduces auxiliary power and increases efficiency. Also, the air flow over the seal reduces the temperature difference very significantly and this leads to improved cell life and performance.

It will also be appreciated that the interconnects 40 e.g., the ribs of the cathode flow field 14 can be formed of materials of different thermal conductivity to control the heat flow. For example, the first two circumferentially extending innermost ribs 48, illustrated in the cathode flow field 14 of FIG. 2 and extending in a radial outward direction, may be formed of a stainless steel material. The two circumferentially extending outermost ribs 50 of that Christmas tree arrangement may be formed of ceramics. Because stainless steel and ceramic materials have different thermal conductivity, the heat transfer is controlled to yield a substantially uniform cell temperature.

In another example, one or two of the ribs 40 adjacent the air or oxygen inlet to the manifold may be formed of the ceramic material while remaining ribs 40 may be formed of a metallic material. This reduces the temperature gradient between the cell and seal in the area of the inlet which among other things inhibits cell cracking. That is by making the interconnects of ceramic material at that location, the cold spot at the entrance to the manifold is not transferred onto the cell and therefore is eliminated effectively minimizing the temperature gradient across the cell. This in turn relieves stress cracking. The remaining interconnects formed of metallic materials help carry the heat away from the cell.

Referring to FIG. 4, there is illustrated a stacked arrangement of the fuel cell modules 10. Current collector plates 54 and 56 are illustrated at opposite ends of the module. It will be appreciated that the module forms part of a fuel cell housing containing various other parts, such as electrical insulation, power strips, terminals, piping for the fuel, and the like necessary to provide an electricity producing fuel cell, all of which other parts are conventional.

Figure 5:
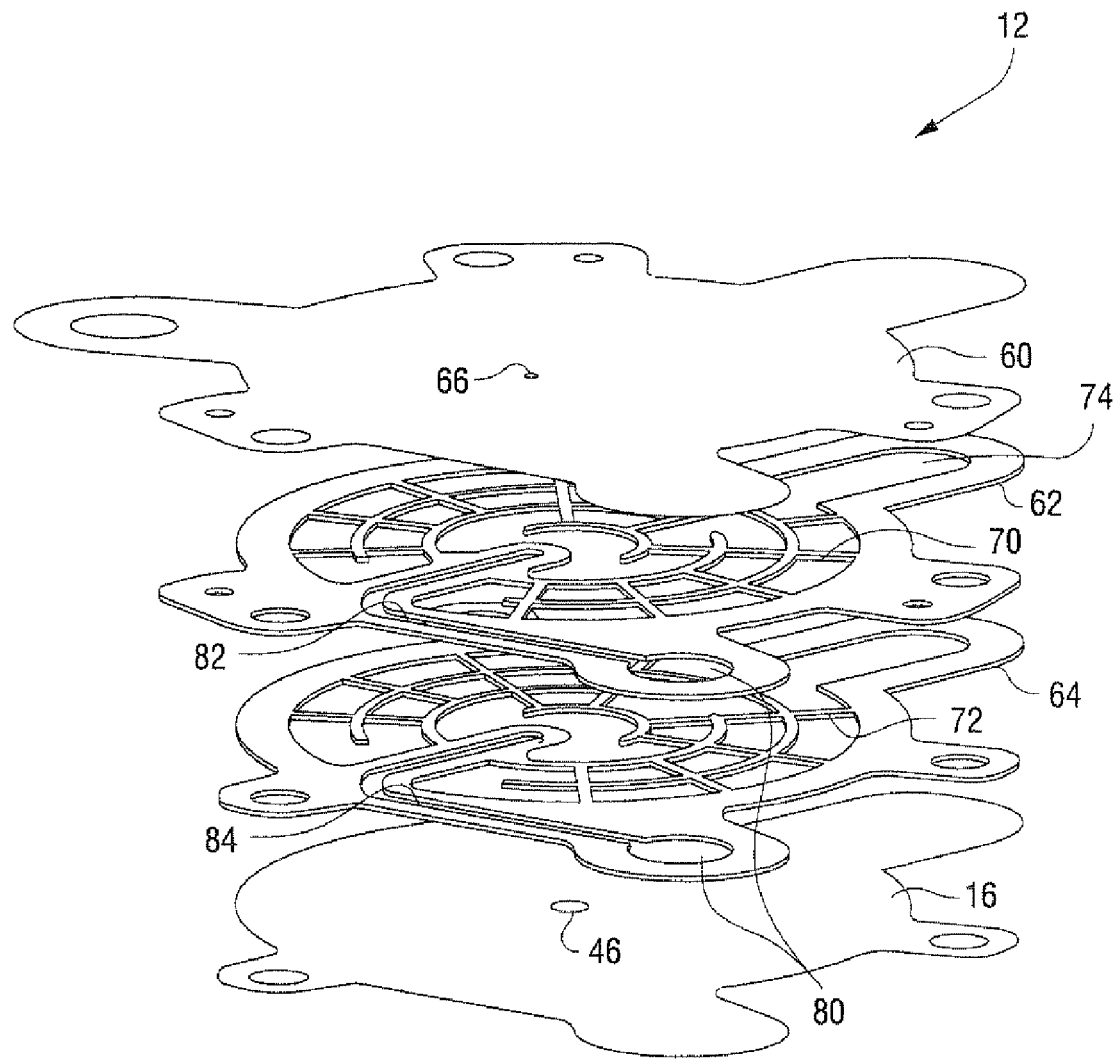
FIG. 5 is an exploded perspective view of the manifold for supplying fuel and oxidant to adjacent cells, respectively.

A preferred manifold 12 is illustrated in FIG. 5 and has multiple layers including a top layer 60, two intermediate layers 62 and 64 and a lower layer 16. It will be appreciated that in the stacked arrangement of the fuel cell modules 10, the manifold 12 including the multiple layers lies between the cathode flow field 14 of one fuel cell and the anode flow field 20 of the next adjacent fuel cell. For example, plate 16 overlies the cathode flow field 14 of one fuel cell and layer 60 underlies the anode flow field of an adjacent fuel cell. The intermediate layers 62 and 64 have various ribs extending radially and circumferentially for flowing oxygen or air through the opening 46 into the cathode flow field 14 and fuel in the opposite direction through an opening 66 in layer 60 to the adjacent anode flow field. For example, when the layers 62 and 64 are secured together between the layers 60 and 16, the generally radially extending ribs 70 and 72 of the layers 62, 64 are staggered relative to one another in circumferential directions while the circumferential ribs register with one another. In this manner, air or oxygen flows through an air or oxygen inlet port 74 and diverges in opposite circumferential directions for preferential cooling of the circumferential seal and flows toward the center of the layers for flow through opening 46 into the cathode flow field. Fuel enters a fuel inlet 80 adjacent the periphery of manifold 12 formed by registering passages 82 and 84 in layers 62 and 64. The fuel flows toward the center of manifold 12 for flow through the fuel outlet or hole 66 and into the anode flow field of the adjacent fuel cell module. Thus, the ribbed arrangement of the intermediate layers and the locations of the holes 46 and 66 enable air or oxygen to flow from the inlet port 74 through opening 46 into the adjacent cathode flow field while peripherally preferentially cooling the cell and the fuel to flow from an inlet port 80 through the hole 66 to the adjacent anode flow field.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A solid oxide fuel cell module comprising:
   a layered array of a manifold, a cathode flow field, an electrolytic layer forming a cell including an anode electrode and a cathode electrode on opposite sides of the electrolytic layer, an anode flow field and an anode flow field closure member;
   said cathode flow field including a central oxidant flow inlet and a plurality of oxidant flow passages in communication with said central oxidant flow inlet;
   said manifold including an oxidant inlet at a peripheral edge of said manifold and an oxidant outlet overlying and in communication with said central oxidant flow inlet of said cathode flow field; and said peripheral edge of said manifold, and peripheral edges of said cathode flow field and said cell and said anode flow field overlying each other and sealed to each other to form a peripheral seal about the fuel cell module, said manifold having discrete passageways extending from said manifold oxidant inlet and arranged to direct oxidant flow in opposite directions, at said manifold oxidant inlet about the peripheral edge of said manifold and then radially inwardly to said manifold oxidant outlet to thereby preferentially direct cathode oxidant flow first about said peripheral seal to cool the peripheral seal and then to said cathode flow field.

2. A fuel cell module according to claim 1 wherein said oxidant flow passages terminate in respective outlets adjacent a periphery of the cathode flow field.

3. A fuel cell module according to claim 1 wherein each of said cathode flow field passages has a general zig-zag configuration between said oxidant flow inlet to said cathode flow field and an associated cathode flow field exit.

4. A fuel cell module according to claim 1 wherein said cathode flow field passages include segments which flow the oxidant in opposite directions relative to one another.

5. A fuel cell module according to claim 4 wherein one of said segments for flowing oxidant in one direction is spaced further from said cathode flow field oxidant inlet than another of said segments for flowing oxidant in the opposite direction.

6. A fuel cell module according to claim 1 wherein said cathode flow field passages extend in generally concentric circular segments enabling oxidant flow in said segments in opposite circular directions relative to one another.

7. A fuel cell module according to claim 6 wherein said cathode flow field has a generally circular configuration.

8. A fuel cell module according to claim 1 wherein the cathode flow field includes interconnects defining in part said flow passages, some of said interconnects being formed of different materials having different thermal conductivities than other of said interconnects.

9. A fuel cell module according to claim 8 wherein said interconnects adjacent said manifold oxidant inlet are formed of material having lower thermal conductivity than other interconnects of said cathode flow field.

10. A fuel cell module according to claim 9 wherein said interconnects adjacent said manifold oxidant inlet are formed of a ceramic material and the other interconnects are formed of a metallic material.

11. A fuel cell module according to claim 1 wherein said manifold oxidant outlet is located centrally of said manifold, a plate between said manifold and said cathode flow field, said plate including a central opening for communicating oxidant from said central manifold outlet to said central oxidant flow inlet.

12. A solid oxide fuel cell module comprising:
a layered array of a manifold, a cathode flow field, an electrolytic layer forming a cell, including a cathode and an anode, an anode flow field and an anode flow field closure member;
said cathode flow field including an oxidant flow inlet and a plurality of oxidant flow passages in communication with said oxidant flow inlet of the cathode flow field and terminating in respective outlets adjacent a periphery of the cathode flow field;
said manifold including an oxidant inlet and an oxidant outlet in communication with said oxidant flow inlet of said cathode flow field;
said manifold, said cathode flow field, said cell, and said anode flow field having overlying peripheral edges sealed to each other to form a peripheral seal about the fuel cell module, said manifold oxidant inlet being disposed adjacent a first peripheral location and passageways extending directly from said manifold oxidant inlet in opposite directions about the peripheral edge of said manifold, terminating at a second peripheral location generally opposite said manifold oxidant inlet and in communication with said manifold oxidant outlet, said passageways lying adjacent said peripheral seal to preferentially cool said seal.

13. A fuel cell module according to claim 12 wherein the cathode flow field includes interconnects defining in part said flow passages, some of said interconnects being formed of different materials having different thermal conductivities than other of said interconnects.

14. A fuel cell module according to claim 13 wherein interconnects adjacent said manifold oxidant inlet are formed of material having lower thermal conductivity than other interconnects of said cathode flow field.

15. A fuel cell module according to claim 14 wherein said interconnects adjacent said manifold oxidant inlet are formed of a ceramic material and the other interconnects are formed of a metallic material.

16. A fuel cell module according to claim 12 wherein each of said cathode flow field passages has a generally zigzag configuration between said oxidant flow inlet to said cathode flow field and an associated cathode flow field outlet.

17. A fuel cell module according to claim 16 wherein said cathode flow field passages include segments which flow the oxidant in opposite directions relative to one another.

18. A fuel cell module according to claim 17 wherein one of said segments for flowing oxidant in one direction said cathode oxidant flow inlet lies centrally of said cathode flow field, being spaced further from said cathode flow field oxidant inlet than another of said segments for flowing oxidant in the opposite direction.

19. A fuel cell module according to claim 12 wherein said cathode flow field passages extend in generally concentric circular segments enabling oxidant flow in said segments in opposite circular directions relative to one another.

20. A fuel cell module according to claim 12 wherein said oxidant flow inlet of the cathode flow field lies centrally of said cathode flow field, and a plate located between said manifold and said cathode flow field, said plate including a central opening for communicating oxidant from said manifold oxidant outlet to said cathode flow field inlet.

21. An array of solid oxide fuel cell modules comprising:
a plurality of fuel cell modules arrayed against one another;
each of said fuel cell modules including a layered array of a manifold, a cathode flow field, an electrolytic layer forming a fuel cell including an anode electrode and a cathode electrode on opposite sides of the electrolytic layer, and an anode flow field, and wherein aligned peripheral edges of said manifold, cathode flow field, fuel cell and anode flow field are sealed to form a peripheral seal;
said cathode flow field of each module including a central oxidant flow inlet and a plurality of oxidant flow passages in communication with said central oxidant flow inlet of the cathode flow field of said fuel cell;
said manifold of each module including an oxidant inlet port and an oxidant outlet in a center of said manifold in communication with said central oxidant flow inlet of said cathode flow field; and
each of said manifolds between said cathode flow field of one module and an anode flow field of an adjacent module having a fuel inlet and a fuel outlet for flowing fuel to the anode flow field of the adjacent module, each respective manifold having passageways extending in opposite directions, at said manifold oxidant inlet and directly about said peripheral seal to a location diametrically opposed to said manifold oxidant inlet where said passageways intersect with a radial passage in communication with said manifold outlet to thereby preferentially direct cathode oxidant flow first into said passageways to cool said peripheral seal immediately upon entry of oxidant flow into said manifold oxidant inlet.

22. An array according to claim 21 wherein said oxidant outlet of each said manifold lies on a side of said manifold remote from said fuel outlet in said array of modules.

\* \* \* \* \*